United States Patent [19]

Paret

[11] Patent Number: 4,934,840
[45] Date of Patent: Jun. 19, 1990

[54] SPHERICAL BEARING ASSEMBLY

[76] Inventor: Dana C. Paret, 305 Marylea Ave., Pittsburg, Pa. 15227

[21] Appl. No.: 335,450

[22] Filed: Apr. 10, 1989

[51] Int. Cl.$^5$ .............................................. F16C 25/08
[52] U.S. Cl. ......................................... 384/497; 384/2
[58] Field of Search .............. 384/497, 496, 495, 523, 384/447, 2

[56] References Cited

U.S. PATENT DOCUMENTS

| | | | |
|---|---|---|---|
| 2,259,881 | 10/1941 | Foley | 384/497 |
| 2,971,770 | 2/1961 | Wagner | 384/497 |
| 2,983,558 | 5/1961 | Rudy | 384/497 |

Primary Examiner—Lenard A. Footland
Attorney, Agent, or Firm—Stephen A. Gratton

[57] ABSTRACT

A spherical bearing comprising a generally spherical shaped inner ball, a fixed outer race having a seamless generally concave bearing surface, and a plurality of individual ball bearings disposed between the spherical inner ball and concave bearing surface to support universal movement of the spherical inner ball. The individual ball bearings are retained between the spherical inner ball and concave bearing surface of the fixed outer race by sealed retaining plates. A cylindrical bore may be provided through the inner ball in some embodiments of the invention for attaching a member such as a shaft to the inner ball.

2 Claims, 2 Drawing Sheets

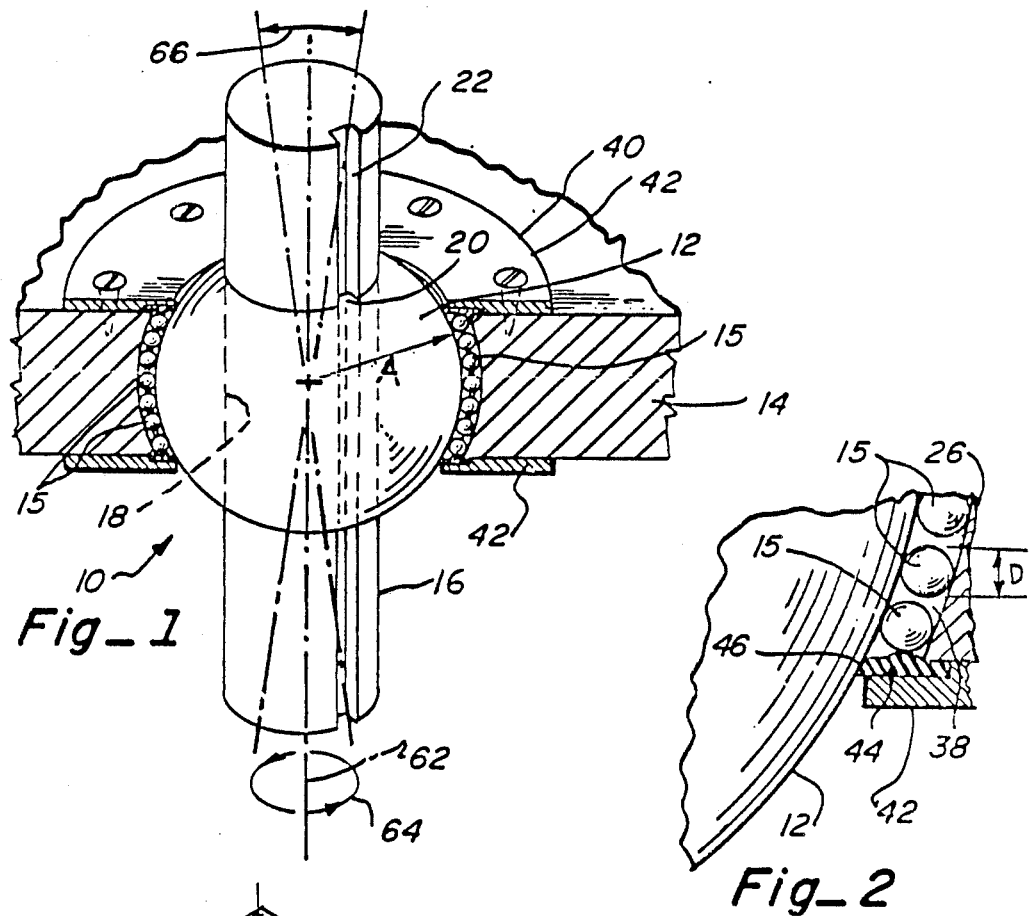
Fig_1
Fig_2
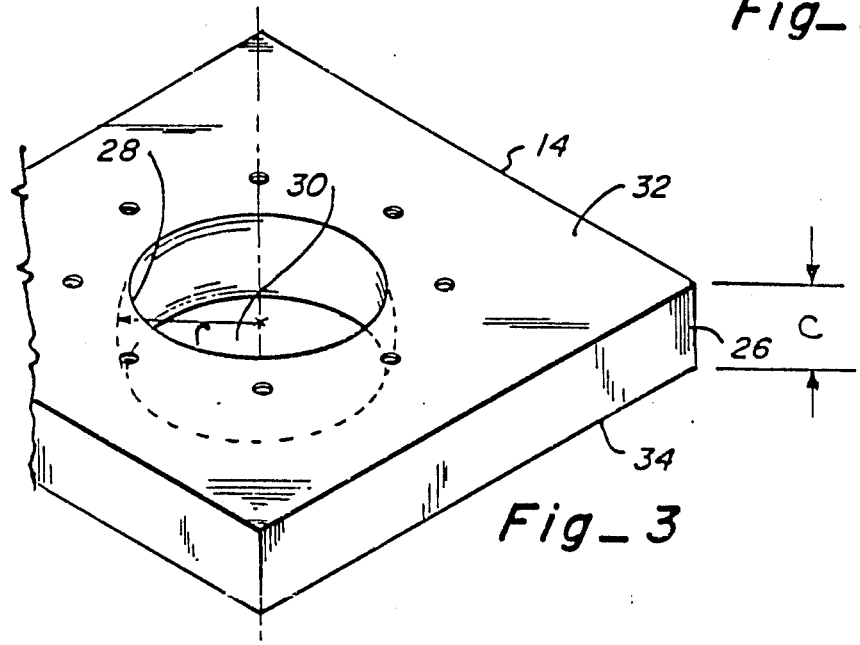
Fig_3

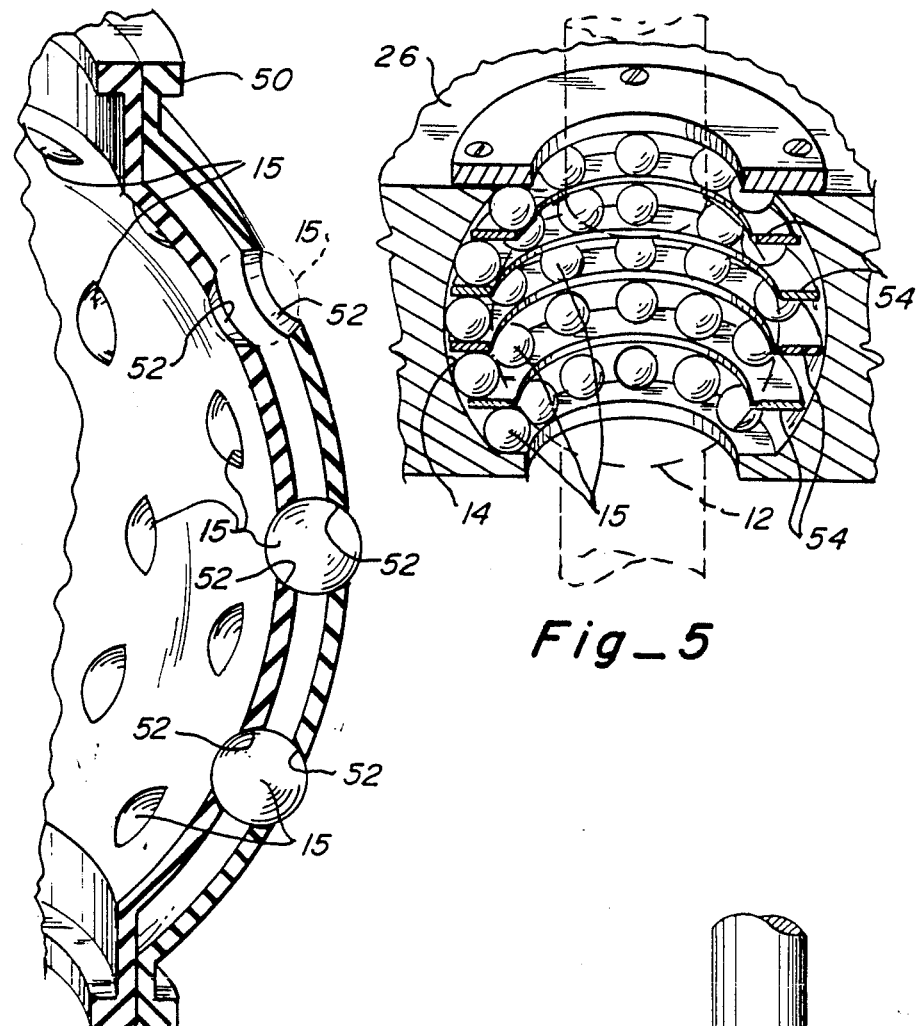
Fig_4
Fig_5
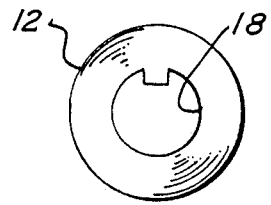
Fig_6  Fig_7
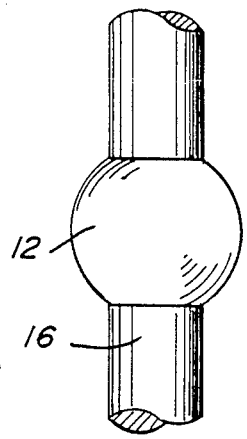
Fig_8

SPHERICAL BEARING ASSEMBLY

BACKGROUND OF THE INVENTION

The present invention relates to bearings and more particularly to spherical bearings.

Spherical bearings are well known in the prior art. In general, spherical bearings are formed with a spherical inner ball and a fixed outer race. The spherical surface of the inner ball abutts and is supported by a complimentary concave bearing surface on the outer race. In general this arrangement supports the inner ball for universal movement with respect to the outer race. Members that are attached to the inner ball can thus be supported for relatively complicated universal movements.

A shaft for example, may be attached to the spherical inner ball and supported for full rotation around its longitudinal axis while at the same time being supported for displacement through an angle of misalignment generally perpendicular to the plane of a stationary support member.

In the simplest spherical bearing design, the generally concave outer race is assembled around the generally spherical inner ball with the bearing elements in direct metal to metal contact. This design is satisfactory for some applications but is prone to high friction, excessive wear, and dirt contamination, especially under high loads and rpm's. In addition, the outer race is most often assembled from two pieces, which creates a sharp seam on the bearing surface. This seam adds to friction and wear on the bearing surfaces.

Another type of spherical bearing commonly known as the "messerschmidt" bearing utilizes complimentary slots on the spherical inner ball and on the outer race. Two small ball bearings are retained within the slots and support the relative motion of the inner ball and outer race. This arrangement provides less friction than metal to metal contact but is still subject to excessive wear due to the sharp edges of the slots and the relatively small bearing surface.

SUMMARY OF THE INVENTION

The present invention overcomes these prior art limitations by providing a spherical bearing design that functions effectively with less friction even at high loads and rpms. Generally stated the spherical bearing comprises a spherical inner ball, a fixed outer race having a seamless concave inner bearing surface, and a plurality of individual ball bearings disposed between the spherical inner ball and concave bearing surface to support universal movement of the spherical inner ball. The ball bearings are retained between the spherical inner ball and concave bearing surface of the outer race by sealed retaining plates. A cylindrical bore may be provided through the inner ball in some embodiments of the invention for attaching a member such as a shaft.

It is thus an object of the present invention to provide a spherical bearing that functions with reduced friction and improved wear properties between bearing surface even under high loads and rpm's.

Another object of the present invention is to provide a spherical bearing having a unitary outer race with a seamless bearing surface.

Yet another object of the present invention is to provide a spherical bearing whose spherical inner ball can be shaped to suit a wide variety of applications.

Another object of the present invention is to provide a spherical bearing with an increased range of motion through an angle of misalignment.

Another object of the present invention is to provide a spherical bearing in which all bearing surfaces can be constructed of relatively hard-wear resistant materials.

Another object of the present invention is to provide a spherical bearing that can be constructed with a range of different material-s depending of its use.

Accordingly, embodiments of a spherical bearing constructed in accordance with the present invention are shown in the accompanying drawing and following description:

BRIEF DESCRIPTION OF THE DRAWINGS

FIG. 1 is a side elevation view partially in cross section of one embodiment of a spherical bearing constructed in accordance with the invention;

FIG. 2 is an enlarged side elevation view of a portion of FIG. 1;

FIG. 3 is a perspective view showing a stationary outer race of one embodiment of a spherical bearing constructed in accordance with the invention;

FIG. 4 is a cross sectioned perspective view partially cut away of a portion of a component sleeve of one embodiment of a spherical bearing constructed in accordance with the invention.

FIG. 5 is a cross sectional side elevation view of one embodiment of a spherical bearing constructed in accordance with the invention.

FIG. 6 is a plan view of a spherical inner bearing constructed in accordance with one embodiment of the invention;

FIG. 7 is a plan view of a spherical inner bearing constructed in accordance with one embodiment of the invention;

FIG. 8 is a side elevation view of a spherical inner bearing constructed in accordance with one embodiment of the invention.

DESCRIPTION OF THE PREFERRED EMBODIMENT

Referring now to FIG. 1, a spherical bearing constructed in accordance with the invention is shown and generally designated as 10. The spherical bearing 10 generally stated comprises a spherical inner ball 12, a stationary outer race 14, and a plurality of individual ball bearings 15 retained between the spherical inner ball 12 and the stationary outer race 14. A member such as a shaft 16 is attached to the inner ball 12 for universal movement therewith.

As shown in FIG. 1, the inner ball 12 is generally spherical in shape. In the illustrative embodiment of the invention shown in FIG. 1, the inner ball 12 is fabricated from a solid hardened steel ball. A machined opening 18 (FIG. 6) is provided through the spherical inner ball 12 for receiving the cylindrical shaft 16. A solid key 20 is provided as a part of the spherical inner 12 for engagement with a keyway 22 on the shaft 16. The opening bore 18 may be formed in the inner bearing 12 by conventional machine shop practices such as EDM. As is apparent this key and keyway arrangement locks the inner ball 12 and shaft 16 together for universal movement with respect to the stationary outer race 14.

Limiting means such as snap rings (not shown) or set screws (not shown) can be mounted on either side of the inner ball 12 to the shaft 16 to limit the longitudinal motion of the shaft 16 in the opening 18 of the inner ball 12. In some applications, such as in robotic design however, some longitudinal movement of the shaft with respect to the inner ball 12 may be desired. In this case the snap rings or other retaining means can be positioned to allow the desired amount of stroke or longitudinal movement of the shaft 16 within the opening 18.

FIGS. 7 and 8 illustrate alternate embodiments of a spherical inner ball 12 constructed in accordance with the invention. In FIG. 7, a through opening 18 of the inner ball 12 is formed to receive a splined shaft. In FIG. 8, the shaft 16 and spherical inner ball 12 are formed as a unitary piece.

Referring now to FIG. 3, the stationary outer race 14 of the spherical bearing 10 is shown. The stationary outer race 14 is formed from a solid plate 26 of material. The stationary outer race 14 includes cylindrical opening 30 with a generally concave bearing surface 28. Bearing surface 28 is formed with a radius of curvature "r" that is complimentary but larger than the radius of the generally spherical outer surface of the inner ball 16.

For forming the concave bearing surface 16, the cylindrical opening 30 is first machined in the solid plate 26 with a diameter equal to or slightly greater than the outside diameter of the inner ball 12. The wall of this cylindrical opening 30 is then machined out to a radius "r" centered midway between the top 32 and bottom 34 surfaces of the solid plate 26 forming the concave bearing surface 28. Radius "r" has a length equal to or slightly greater than the combined length of the radius of the inner ball 12 and the diameter of an individual bearing 15. The diameter of the individual bearings 15 being determined by the thickness of solid plate 26 or, more precisely, the distance between the outer surface of the inner ball 12 and the junction of the cylindrical opening 30 with the top 32 or bottom 34 surfaces of solid plate 26 when the center of inner ball 12 is placed in the cylindrical opening 30 midway between the top 32 and bottom 34 surfaces of solid plate 26. It is essential to the proper function of this bearing assembly 10 that these four dimensions, the thickness of the solid plate 26, the diameter of the inner ball 12, the diameter of the individual bearings 15 and the radius of the concave bearing surface 28, be related to one another in the above described manner.

The inventor has derived the following formulae to describe the above relationship:

A = radius of inner ball (12)
B = clearance space between the inner ball 12, the individual ball bearings 15, and the concave bearing surface 28, in the range of 0.005 inches to 0.0001 inches
C = thickness of solid plate 26
D = diameter of individual ball bearings 15
r = radius of curvature of concave bearing surface 28
$D = r - A - 2B$ and
$A^2 + (C/2)^2 = r^2$ In the embodiment of the spherical bearing 10 illustrated in FIG. 1, the plurality of individual ball bearings 15 are poured into the annular space 38 (FIG. 2) formed between the inner ball 12 and the concave bearing surface 28 of the inner race 14. Retaining plates 40, 42 are attached to the top 32 and bottom 34 surfaces of solid plate 26 for retaining the individual ball bearings 15 in the annular space 38. Each retaining plate 40, 42 is formed with a circular opening 46 having an inside diameter that is less than the outside diameter of the spherical inner ball 12 but approximately equal to a chordal diameter of the inner ball at the point of intersection of the inner ball 12 and retaining plates 40, 42. In addition, as shown in FIG. 2, the inside surface of the opening 46 may be shaped to conform to the radius of curvature of the spherical inner ball 12. In operation of the spherical bearing 10, almost all of the bearing load on the inner ball 12 is transferred through the plurality of individual ball bearings 15 to the solid plate 26. Since the amount of bearing loads supported by the retaining plates 40. 42 is minimized by adherence to the aforementioned design formulae, they can be made of relatively light gauge material. Additionally, the retaining plates 40, 42 may be attached to solid plate 26 by any conventional means such as for example, fasteners, welding, soldering, or glueing.

As shown in FIG. 2, elastomeric seals 44 are sandwiched between the solid plate 26 and retaining plates 40, 42 in recesses in retaining plates 40, 42. The seals 44 have a rounded edge which protrudes into the annular space 38 between the inner bearing 12 and stationary outer race 14 to prevent contaminants such as dirt and moisture from entering the annular space 38 and bearing surfaces of the spherical bearing 10.

The number of individual ball bearings 15 in the annular space 38 can be varied depending on the size, loading, and wear requirements of the spherical bearing 10. In general, a high number of individual ball bearings produces a higher coefficient of friction but is stronger and more wear resistant. In general, for most applications the number of individual ball bearings 15 will be in the range of 150-2000.

Additionally, the construction material of the spherical inner ball 12, the stationary outer race 14 and the individual ball bearings 15 can be varied to suit the size and loading requirements of the spherical bearing 10. For most applications, these components must be fabricated of high grade hardened steel capable of withstanding high loads and speeds. Other materials however, such as copper, brass and plastic may be satisfactory for some applications.

In the embodiment of the spherical bearing 10 illustrated in FIG. 1, the individual ball bearings 15 are loosely retainined in the stationary outer race 14 by the retaining plates 40 and 42. Alternately, as shown in FIG. 4, a two piece sleeve 50 of elastomeric material such as plastic or rubber can be utilized to maintain the individual ball bearings 15 in a spaced matrix. The sleeve 50 can be formed with a plurality of spaced countersunk openings 52 for individually retaining each ball bearing 15. Additionally, the inside and outside diameter of the sleeve 50 can be sized to conform to the shape of the spherical inner ball 12 and the concave outer race 14.

In yet another embodiment of the invention, as shown in FIG. 5 a series of stacked racer rings 54 may be utilized to maintain the plurality of individual ball bearings 15 in a layered array. Again, the inside and outerside diameter of the racer rings 54 may be sized to conform to the diameter of the inner ball 12 and concave outer race 14.

Referring again to FIG. 1, with a spherical bearing 10 constructed in accordance with the invention, the inner ball 12 is supported for universal movement within the outer race 14. The relatively large number of individual ball bearings will support relatively larger bearing loads on the inner ball 12. Additionally, the spherical shape of the individual ball bearings 15 provides reduced friction between the inner ball 12 and outer race 14 than with prior art spherical bearings having metal to metal contact. Moreover, since the outer race 14 is formed as a single piece, there are no friction causing seams between bearing surfaces.

As shown in FIG. 1, the shaft 16 is supported for full circular rotation about its longitudinal axis 62. This motion is indicated by circular arrow 64. In addition, the shaft 16 is supported for an angle of misalignment with respect to the perpendicular. The arc range of motion is indicated by double headed arrow 66. This angle of misalignment is limited by interference contact between the shaft 16 and the upper and lower retaining plates 40, 42. In general, a main plate 26 with a thickness equal to one-half the diameter of the inner ball will allow an angle of misalignment of between 0 and 30 degrees. A thinner main plate 26 will allow a greater angle of misalignment but reduce the load capacity of the bearing assembly 10. Likewise, a smaller diameter shaft will allow an increased angle of misalignment.

While the spherical bearing 10 of the present invention has been disclosed for use with a cylindrical shaft, it should be appreciated that the spherical bearing 10 can be used to join other members for relative universal motion. As disclosed the present invention provides a spherical bearing with less friction and better wear properties than conventional spherical bearings.

While the present invention has been disclosed in connection with preferred embodiments thereof, it should be understood however, that there may be other embodiments which fall within the scope and spirit of the invention as defined by the following claims:

What is claimed is:

1. A spherical bearing comprising:
   a stationary outer race fabricated from a solid piece of material having a through opening with a seamless generally concave bearing surface
   a generally spherically shaped inner ball mounted for universal movement within the stationary outer race with an annular space formed between the inner ball and outer race;
   a plurality of individual ball bearings disposed in the annular space between the inner ball and concave bearing surface to support the inner ball for universal movement;
   retaining means comprising flat retaining plates attached to the solid plate on either side of the inner ball for retaining the individual ball bearings in the annular space between the inner ball and concave bearing surface;
   sealing means comprising elastomeric seals sandwiched between the retaining plate and solid plate for sealing the concave bearing surface, the inner ball and the individual ball bearings, and
   attaching means for attaching a member to the inner ball for movement with the inner ball.

2. A spherical ball bearing comprising:
   a stationary outer race having an opening therethrough with a seamless generally concave bearing surface;
   a generally spherically shaped inner ball mounted within the stationary outer race and sized to form an annular space between the inner ball and concave bearing surface;
   a plurality of individual ball bearings mounted in the annular space in engagement with the inner ball and concave bearing surface for supporting the inner ball for universal movement with respect to the stationary outer race;
   retaining means for retaining the individual ball bearings in the annular space;
   sealing means for sealing the annular space;
   attaching means for attaching a member to the inner ball, and wherein a dimensional relationship exists between the inner ball, the stationary outer race, and the individual ball bearings as follows:
   A = radius of inner ball
   B = clearance space between the inner ball, the individual ball bearings, and the concave bearing surface, in the range of 0.005 inches to 0.0001 inches
   C = thickness of outer race
   D = diameter of individual ball bearing
   r = radius of curvature of concave bearing surface
   $D = r - A - 2B$ and
   $A^2 + (C/2)^2 + r^2$.

* * * * *

UNITED STATES PATENT AND TRADEMARK OFFICE
CERTIFICATE OF CORRECTION

PATENT NO. : 4,934,840

DATED : June 19, 1990

INVENTOR(S) : Dana C. Paret

It is certified that error appears in the above-identified patent and that said Letters Patent is hereby corrected as shown below:

Col. 6, line 46,

The formula "$A^2 + (C/2)^2 + r^2$" should read --$\underline{A}^2 + (C/2)^2 = r^2$--.

Signed and Sealed this

Second Day of July, 1991

Attest:

Attesting Officer

HARRY F. MANBECK, JR.

Commissioner of Patents and Trademarks